United States Patent
Kim et al.

(10) Patent No.: US 7,724,328 B2
(45) Date of Patent: May 25, 2010

(54) DUAL DISPLAY APPARATUS

(75) Inventors: Sung-Min Kim, Yongin-si (KR);
Young-Bee Chu, Suwon-si (KR);
Kyu-Seok Kim, Yongin-si (KR);
Jeong-Seok Oh, Seoul (KR); Jeung-Soo Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 796 days.

(21) Appl. No.: 11/501,302

(22) Filed: Aug. 9, 2006

(65) Prior Publication Data
US 2007/0139590 A1     Jun. 21, 2007

(30) Foreign Application Priority Data
Dec. 19, 2005     (KR) .................. 10-2005-0125225

(51) Int. Cl.
*G02F 1/1335* (2006.01)
*G02F 1/1343* (2006.01)

(52) U.S. Cl. .................. 349/114; 349/113; 349/144

(58) Field of Classification Search ............... 349/114, 349/113, 144
See application file for complete search history.

(56) References Cited

U.S. PATENT DOCUMENTS

| | | | | |
|---|---|---|---|---|
| 6,741,308 B2 * | 5/2004 | Ha | | 349/114 |
| 6,757,038 B2 * | 6/2004 | Itoh et al. | | 349/113 |
| 6,771,334 B2 * | 8/2004 | Kubota et al. | | 349/106 |
| 6,791,643 B2 * | 9/2004 | Chuang | | 349/113 |
| 7,009,592 B2 * | 3/2006 | Shen et al. | | 345/87 |
| 7,084,942 B2 * | 8/2006 | Luo | | 349/114 |
| 7,102,715 B2 * | 9/2006 | Kim et al. | | 349/114 |
| 2004/0080686 A1 | 4/2004 | Chuang | | |
| 2004/0189902 A1 | 9/2004 | Kim et al. | | |
| 2008/0030484 A1 * | 2/2008 | Cho et al. | | 345/176 |

FOREIGN PATENT DOCUMENTS

CN     1627137 A     6/2005

* cited by examiner

*Primary Examiner*—Mike Qi
(74) *Attorney, Agent, or Firm*—Cantor Colburn LLP

(57) ABSTRACT

An apparatus for dual display includes a light unit providing a light and a display panel. The display panel includes a transmissive pixel transmitting the light from the light unit and a reflective pixel reflecting the light from the light unit. The display panel displays a first image on one side of the light unit by using the light transmitted by the transmissive pixel, and displays a second image on an opposite side of the light unit by using the light reflected by the reflective pixel. The display panel includes a first substrate, a second substrate combined with the first substrate and disposed adjacent to the light unit, and a liquid crystal layer interposed between the first and the second substrates. The display panel further includes a reflective layer formed on the first substrate corresponding to the reflective pixel. Therefore, a total thickness of the apparatus for dual display can be reduced considerably by using the light unit as a second display screen.

19 Claims, 6 Drawing Sheets

DUAL DISPLAY APPARATUS

The present application claims priority to Korean Patent Application No. 2005-0125225, filed on Dec. 19, 2005, and all the benefits accruing therefrom under 35 USC §119, the contents of which in its entirety are herein incorporated by reference.

BACKGROUND OF THE INVENTION

1. Field of the Invention

The present invention relates to an apparatus for dual display. More particularly, the present invention relates to an apparatus for dual display having a reduced thickness.

2. Description of the Related Art

Generally, a display apparatus displaying an image is used in a mobile electronic device such as a mobile telecommunication terminal, a digital camera, an electronic dictionary, etc. Various kinds of display apparatuses may be used for displaying an image, and a liquid crystal display ("LCD") apparatus is often used because of its small size, light weight and convenient mobility. The LCD apparatus has advantages which include having a thin thickness, a light weight, a low driving voltage and a low power loss with respect to other display apparatuses.

The LCD apparatus, in general, displays an image only in uni-direction (e.g., single display). However, a bi-directional display apparatus has been developed recently. The bi-directional display apparatus displays a same image or a different image in bi-direction (e.g., dual display).

The bi-directional display apparatus may be classified as either a twin type or a two way type. The twin type display apparatus displays an image by using a display module having two light units and two display panels. The two way type display apparatus displays an image by using a display module having one light unit and two display panels.

However, both the twin type and the two way type LCD apparatuses increase a thickness of the display module, because both the twin type and the two way type LCD apparatuses use one/two light unit(s) and two display panels. Therefore, the twin type and the two way type LCD apparatuses are limited in having a display module with a reduced thickness.

BRIEF SUMMARY OF THE INVENTION

The present invention provides an apparatus for dual display having one light unit and one display panel in order to reduce the total thickness of the dual display apparatus.

In an exemplary embodiment of an apparatus for dual display according to the present invention, the apparatus for dual display includes a display panel and a light unit providing a light. The display panel includes a transmissive pixel transmitting the light provided from the light unit, and a reflective pixel reflecting the light provided from the light unit. The display panel displays a first image by using the light from the light unit transmitted by the transmissive pixel, and displays a second image by using the light from the light unit reflected by the reflective pixel.

The display panel comprises a first substrate, a second substrate opposite to the first substrate and combined with the first substrate, and a liquid crystal layer interposed between the first substrate and the second substrate. The second substrate is disposed adjacent to the light unit.

The display panel further comprises a reflective layer formed on the first substrate corresponding to the reflective pixel.

In another exemplary embodiment of an apparatus for dual display according to the present invention, the apparatus for dual display comprises a light unit providing a light, and a display panel. The display panel includes a thin film transistor ("TFT") substrate, a color filter substrate combined with the TFT substrate and disposed adjacent to the light unit, and a liquid crystal layer interposed between the TFT substrate and the color filter substrate. The display panel further comprises a transmissive pixel transmitting the light from the light unit, and a reflective pixel having a reflective layer reflecting the light from the light unit.

In still another exemplary embodiment of an apparatus for dual display according to the present invention, the apparatus for dual display comprises a light unit providing a light, and a display panel. The display panel includes a thin film transistor ("TFT") substrate disposed adjacent to the light unit, a color filter substrate combined with the TFT substrate, and a liquid crystal layer interposed between the TFT substrate and the color filter substrate. The display panel further comprises a transmissive pixel transmitting the light from the light unit, and a reflective pixel having a reflective layer reflecting the light from the light unit.

Therefore, a total thickness of the apparatus for dual display, which has one light unit and one display panel to display an image bi-directionally, can be reduced considerably.

BRIEF DESCRIPTION OF THE DRAWINGS

The above and other features and advantages of the present invention will become more apparent by describing exemplary embodiments thereof with reference to the accompanying drawings, in which.

DETAILED DESCRIPTION OF THE INVENTION

Figure 1:
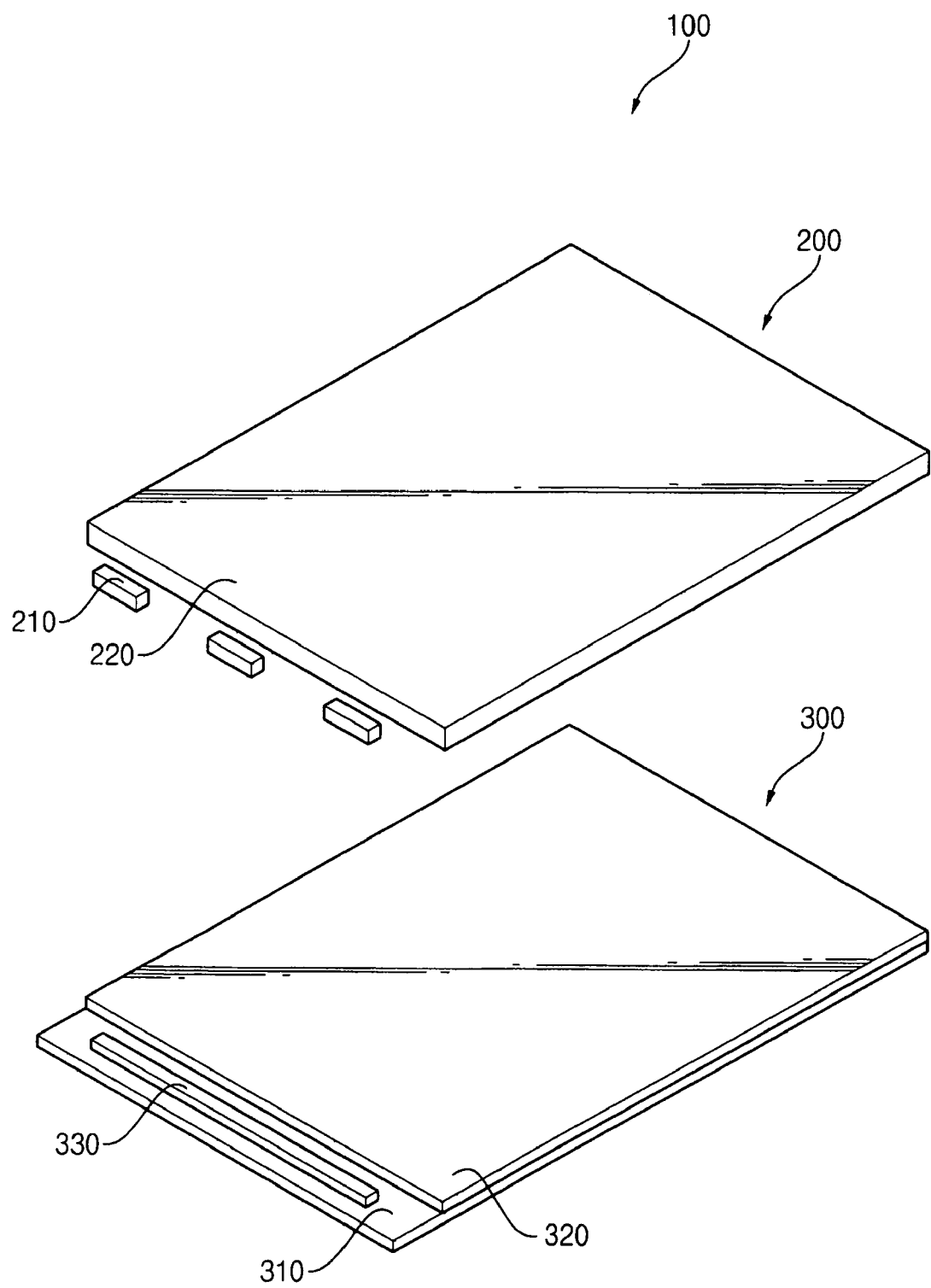
FIG. 1 is an exploded perspective view illustrating an apparatus for dual display according to an exemplary embodiment of the present invention.

The present invention is described more fully hereinafter with reference to the accompanying drawings, in which exemplary embodiments of the invention are shown. The present invention may, however, be embodied in many different forms and should not be construed as being limited to the exemplary embodiments set forth herein. Rather, these exemplary embodiments are provided so that this disclosure will be thorough and complete, and will fully convey the scope of the invention to those of ordinary skill in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein are interpreted accordingly.

The terminology used herein is for the purpose of describing particular exemplary embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the present invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, exemplary embodiments of the present invention should not be construed as being limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the exemplary embodiments of the present invention will be described with reference to the accompanied drawings.

Figure 2:
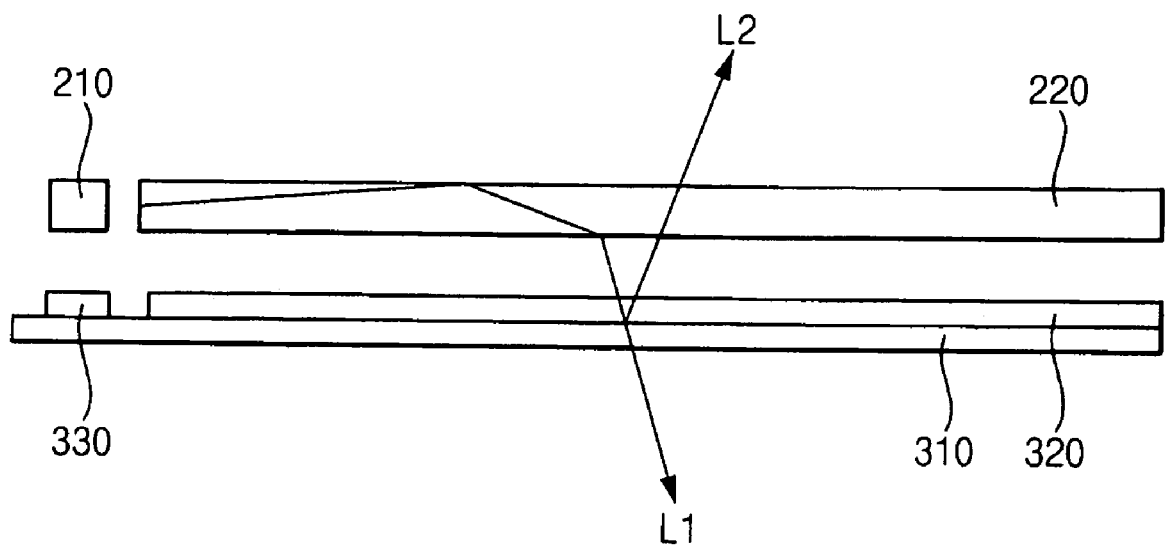
FIG. 2 is a side view illustrating the apparatus for dual display in FIG. 1.

FIG. 1 is an exploded perspective view illustrating an apparatus for dual display according to an exemplary embodiment of the present invention. FIG. 2 is a side view illustrating the apparatus for dual display in FIG. 1.

Referring to FIGS. 1 and 2, the apparatus for dual display 100 according to an exemplary embodiment of the present invention includes a light unit 200 and a display panel 300.

The light unit 200 provides a light for displaying an image to the display panel 300. The light unit 200 includes a light source 210 and a light guide plate 220.

At least one of the light sources 210 is disposed adjacent to the light guide plate 220, and the light source 210 emits the light in response to an external power source. In an exemplary embodiment, the light source 210 may be a light emitting diode ("LED"). Since the LED emits light within a limited angle range, the light unit 200 desirably includes a plurality of LEDs to emit uniform light to the light guide plate 220. The number of the LEDs may be changed according to the light emitting angle and the size of the light guide plate 220.

In another exemplary embodiment, the light source 210 may be a cold cathode fluorescent lamp ("CCFL") having a long cylindrical shape.

The light guide plate 220 guides the light generated from the light source 210, and the light exits toward the display panel 300.

The light guide plate 220 includes a transparent material to minimize light loss. For example, the light guide plate 220 includes a material with a high hardness such as polymethyl methacrylate ("PMMA") or a material with a high thermo-stability, such as poly carbonate ("PC").

The upper surface of the light guide plate 220, which is on the opposite side or distal from the display panel 300, may include a light reflective pattern to dispersively reflect the light. The light reflective pattern may include a plurality of regular or irregular concavo-convex shapes with a predetermined pitch. The light generated from the light source 210 enters the light guide plate 220, and is dispersively reflected by the light reflective pattern. Among the reflected light, the light of which a path forms an angle smaller than a critical angle with respect to a normal line of the light guide plate 220 exits from the light guide plate 220 toward the display panel 300.

The display panel 300 displays an image by using the light provided from the light unit 200. The display panel 300 displays a first image by using a light L1 that is provided by the light unit 200 and passes through the display panel 300. The display panel 300 also displays a second image by using a light L2 that is provided by the light unit 200 and reflected in the display panel 300.

The display panel 300 includes a first substrate 310, a second substrate 320 disposed opposite the first substrate 310 and combined with the first substrate 310, and a liquid crystal layer (not shown) interposed between the first substrate 310 and the second substrate 320. The second substrate 320 is adjacent to the light unit 200. In other words, the second substrate 320 is, interposed between the light unit 200 and the first substrate 310.

The first substrate 310 is a thin film transistor ("TFT") substrate having driving elements such as a signal line, a transistor, etc., formed thereon. The second substrate 320 is a color filter substrate having a color filter layer formed thereon to express various colors.

The display panel 300 further includes a driving chip 330 mounted on the first substrate 310. The driving chip 330 may be electrically connected to the first substrate 310 through an anisotropic conductive film ("ACF"), for example.

The driving chip 330 drives the display panel 300 to display the first image and the second image in response to an external control signal.

In an exemplary embodiment, the first image displayed by the display panel 300 may be different from the second image displayed by the display panel 300. When a user watches the first image, the second image is displayed on the other side of the display panel 300. When the first image is the same as the second image, the user's privacy may be infringed because of the exposure of the second image is the same as the first image, which the user watches. Therefore, it is advisable that the first image be different from the second image. However, in another exemplary embodiment, the first image displayed by the display panel 300 may be the same as the second image displayed by the display panel 300.

Figure 3:
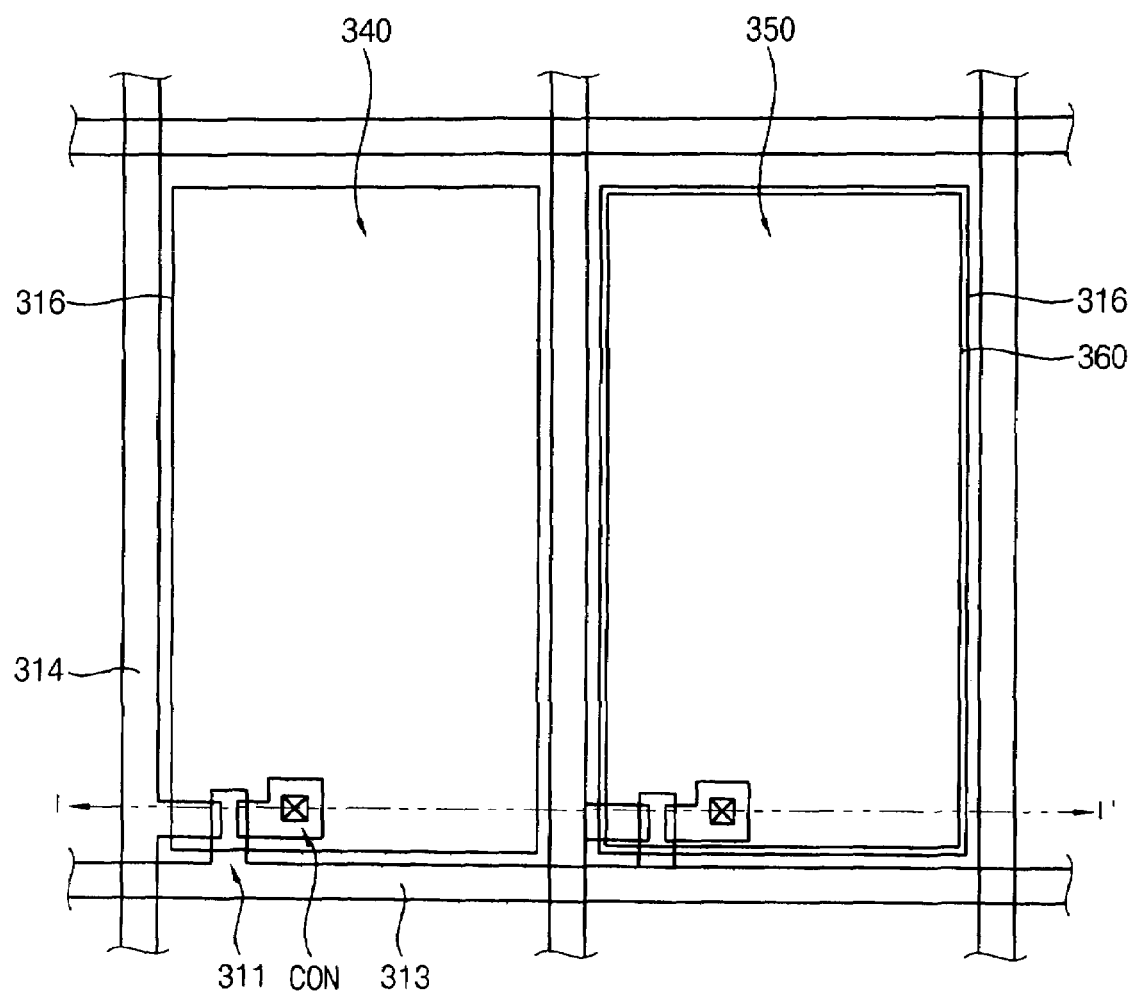
FIG. 3 is a plan view layout illustrating a portion of a display panel illustrated in FIG. 1.
Figure 4:
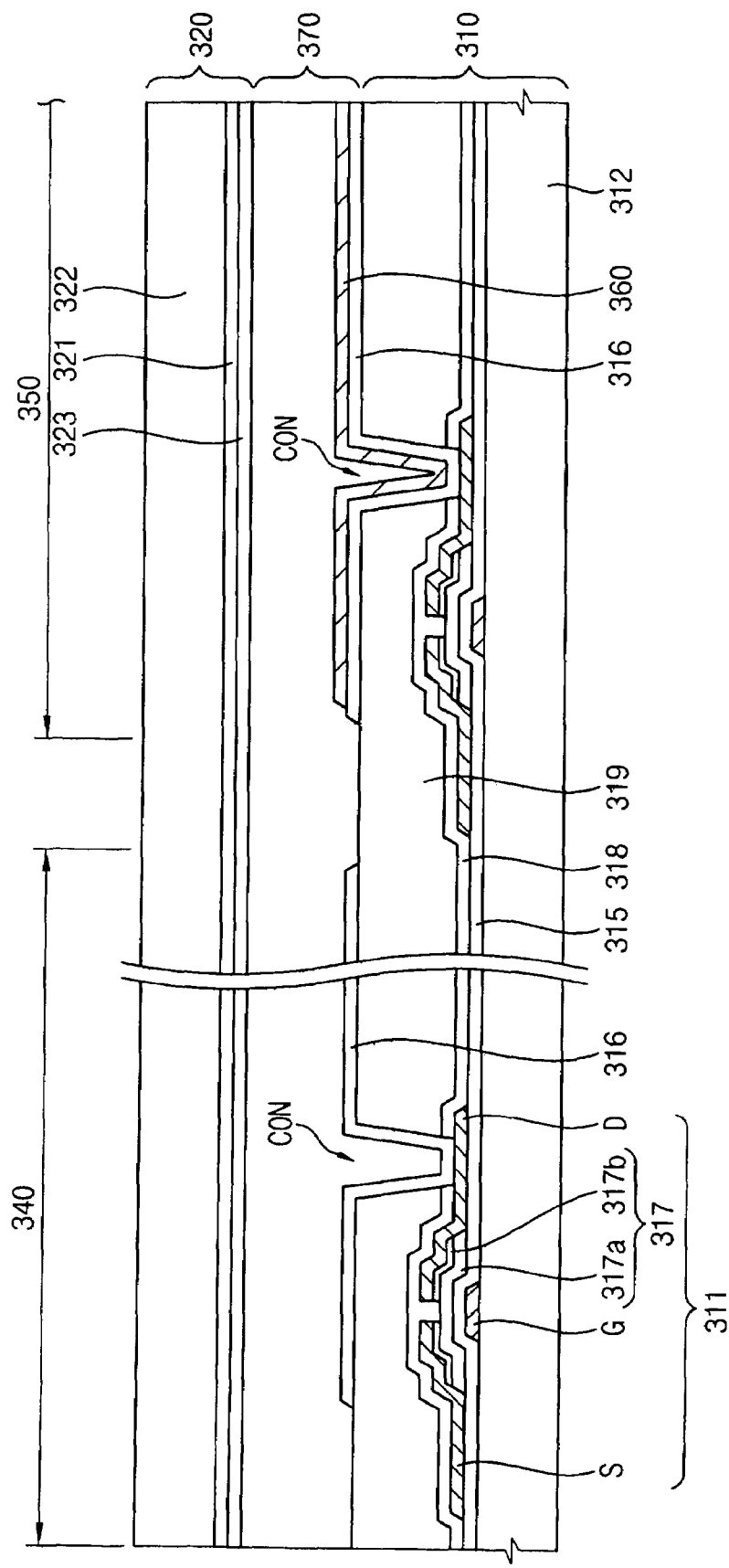
FIG. 4 is a partial cross-sectional view taken along line I-I' of FIG. 3.

FIG. 3 is a plan view layout illustrating a portion of a display panel in FIG. 1. FIG. 4 is a cross-sectional view taken along line I-I' of FIG. 3.

Referring to FIGS. 3 and 4, the display panel 300 includes a plurality of transmissive pixels 340 and a plurality of reflective pixels 350 (only one of each shown). The plurality of transmissive pixels 340 transmits the light emitted from the light unit 200 and the plurality of reflective pixels 350 reflects the light emitted from the light unit 200. The plurality of transmissive pixels 340 and the plurality of reflective pixels 350 are alternately disposed with respect to each other.

Therefore, the display panel 300 displays the first image along a first direction by using the light transmitted from the plurality of transmissive pixels 340, and the display panel 300 displays the second image along a second direction opposite to the first direction by using the light reflected from the plurality of reflective pixels 350. The first image and the second image, which are displayed by the display panel 300, may be the same or different from each other.

The plurality of transmissive pixels 340 and the plurality of reflective pixels 350 are driven respectively. In an exemplary embodiment, the display panel 300 may drive both the plurality of transmissive pixels 340 and the plurality of reflective pixels 350 simultaneously, and may also display the first image and the second image simultaneously. Alternatively, the display panel 300 may drive only the plurality of transmissive pixels 340 and display the first image, or the display panel 300 may drive only the plurality of reflective pixels 350 and display the second image.

The first substrate 310 that corresponds to the TFT substrate includes a plurality of signal lines and a thin film transistor ("TFT") 311. The plurality of transmissive pixels 340 and the plurality of reflective pixels 350 are defined by the plurality of signal lines. A respective TFT 311 is formed at each of the respective plurality of transmissive pixels 340 and the respective plurality of reflective pixels 350.

Particularly, the first substrate 310 includes a transparent substrate 312, a plurality of gate lines 313 formed on the transparent substrate 312, a plurality of data lines 314 and a plurality of TFTs 311.

The transparent substrate 312 is formed of a transparent material capable of transmitting the light. For example, the transparent substrate 312 includes a glass.

The plurality of gate lines 313 is formed on the transparent substrate 312. Each of the plurality of transparent pixels 340 and the plurality of reflective pixels 350 may be defined as an upper side or a lower side pixel with respect to the gate lines 313.

A gate insulating layer 315 is formed on the plurality of gate lines 313. In detail, the gate insulating layer 315 is formed on the transparent substrate 312 having the plurality of gate lines 313 formed thereon to cover the plurality of gate lines 313. The gate insulating layer 315, for example, includes a silicon nitrated ("SiNx") layer or a silicon oxidized ("SiOx") layer.

The plurality of data lines 314 is formed on the gate insulating layer 315, and defines a left and a right side of each of the respective plurality of transmissive pixels 340 and the respective plurality of reflective pixels 350.

Each TFT 311 is electrically connected to one of the gate lines 313 and one of the data lines 314, and is formed on an inside portion of the respective transmissive pixel 340 and the respective reflective pixel 350. The TFT 311 provides an image signal applied thereto through the data line 314, to a pixel electrode 316 in response to a scanning signal applied thereto through the gate line 313.

The TFT 311 includes a gate electrode G, an active layer 317, a source electrode S and a drain electrode D.

The gate electrode G is electrically connected to the gate line 313, and corresponds to a gate terminal of the TFT 311.

The active layer 317 is formed on a portion of the gate insulating layer 315, which corresponds to the gate electrode G. The active layer 317 includes a semiconductor layer 317a and an ohmic contact layer 317b. The semiconductor layer 317a includes amorphous silicon (hereinafter, 'a-Si'), and the ohmic contact layer 317b includes $N^+$ amorphous silicon (hereinafter, '$N^+$ a-Si') doped with a high intensive N-type impurity.

The source electrode S is electrically connected to the data line 314, and extends to the upper portion of the active layer 317. The source electrode S corresponds to a source terminal of the TFT 311.

The drain electrode D is formed on the active layer 317 separated from the source electrode S. The drain electrode D corresponds to a drain terminal of the TFT 311. The drain electrode D is electrically connected to the pixel electrode through a contact hole CON formed at a protective layer 318 and a planarizing layer 319.

The source electrode S and the drain electrode D are separately arranged from each other to form a channel on the TFT 311.

The protective (or passivation) layer 318 is formed on the gate insulating layer 315 having the plurality of data lines 314 and the TFT 311 formed thereon to cover the data lines 314 and the TFT 311. The protective layer 318, for example, includes the silicon nitrated ("SiNx") layer or the silicon oxidized ("SiOx") layer.

The planarizing layer 319 is formed on the protective layer 318. The planarizing layer 319 and the protective layer 318 have the contact hole CON to expose a portion of the drain electrode D of the TFT 311.

To increase a reflexibility of the light reflected from the reflective pixel 350 and to enhance a viewing angle, a reflective pattern may be formed on the upper portion of the planarizing layer 319.

The pixel electrode 316 is formed on the planarizing layer 319. The pixel electrode 316 is formed on the planarizing layer 319 corresponding to the transmissive pixel 340 and the reflective pixel 350, respectively. The pixel electrode 316 is electrically connected to the drain electrode D through the contact hole CON formed at the planarizing layer 319 and the protective layer 318.

The pixel electrode 316 includes a transparent conductive material capable of transmitting the light. For example, the pixel electrode 316 includes indium zinc oxide ("IZO") or indium tin oxide ("ITO").

To reflect the light provided from the light unit 200 (FIGS. 1 and 2), the display panel 300 further comprises a reflective layer 360. The reflective layer 360 is formed on the pixel electrode 316 corresponding to the reflective pixel 350. The reflective layer 360 is formed of a conductive material with a high reflexibility to reflect the light. For example, the reflective layer 360 may be a single layer made of aluminum-neodymium ("AlNd") or double layer made of aluminum-neodymium ("AlNd") and molybdenum-wolfram ("MoW").

In addition, the second substrate 320 being a color filter substrate includes a color filter layer 321 to express a color.

More particularly, the second substrate 320 includes a transparent substrate 322, the color filter layer 321 formed on the transparent substrate 322 and a common electrode 323.

The transparent substrate 322 is formed of a transparent material capable of transmitting the light. For example, the transparent substrate 322 includes a glass.

The color filter layer 321 is formed on a facing surface of the transparent substrate 322 opposite to the first substrate 310. The color filter layer 321 includes color filters such as a red (R) color filter, a green (G) color filter and a blue (B) color filter to express colored light.

The common electrode 323 is formed on the color filter layer 321 opposite to the first substrate 310. The common electrode 323 is also formed of a transparent conductive material capable of transmitting the light. For example, the common electrode 323 includes indium zinc oxide ("IZO") or indium tin oxide ("ITO").

A liquid crystal layer 370 interposed between the first substrate 310 and the second substrate 320 has liquid crystal molecules having a predetermined arrangement so that the liquid crystal layer 370 has an optical and an electrical characteristic such as an anisotropic refractive index and an anisotropic dielectric constant, respectively. When an electric field is induced between the pixel electrode 316 and the common electrode 323, an arrangement of the liquid crystal molecules of the liquid crystal layer 370 is changed to control a transmissivity of the light.

The display panel 300 displays the first image by using the light transmitted by the transmissive pixel 340 in the direction of the first substrate 310 corresponding to the TFT substrate. The display panel 300 displays the second image that is different from the first image by using the light reflected by the reflective pixel 360 in the direction of the second substrate 320 corresponding to the color filter substrate.

Therefore, the dual display device 100 can reduce a total thickness of the device considerably, and also eliminate any anxiety about infringement of privacy when viewing either side of the display device 100.

Figure 5:
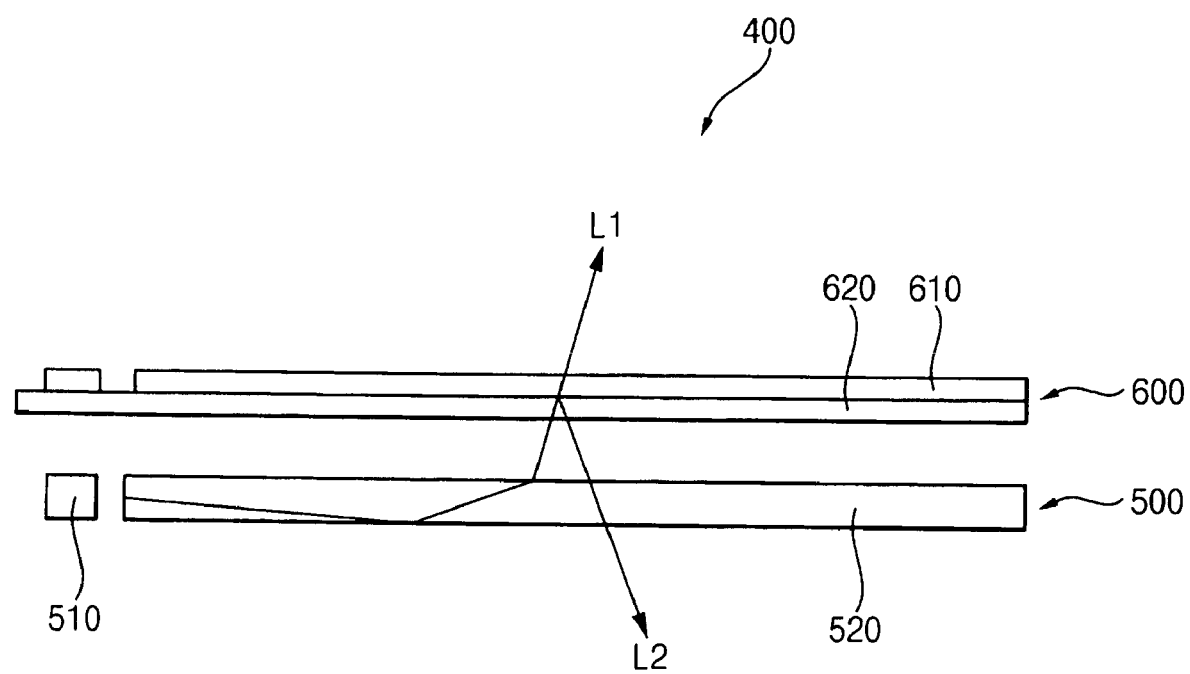
FIG. 5 is a side view illustrating an apparatus for dual display according to another exemplary embodiment of the present invention.
Figure 6:
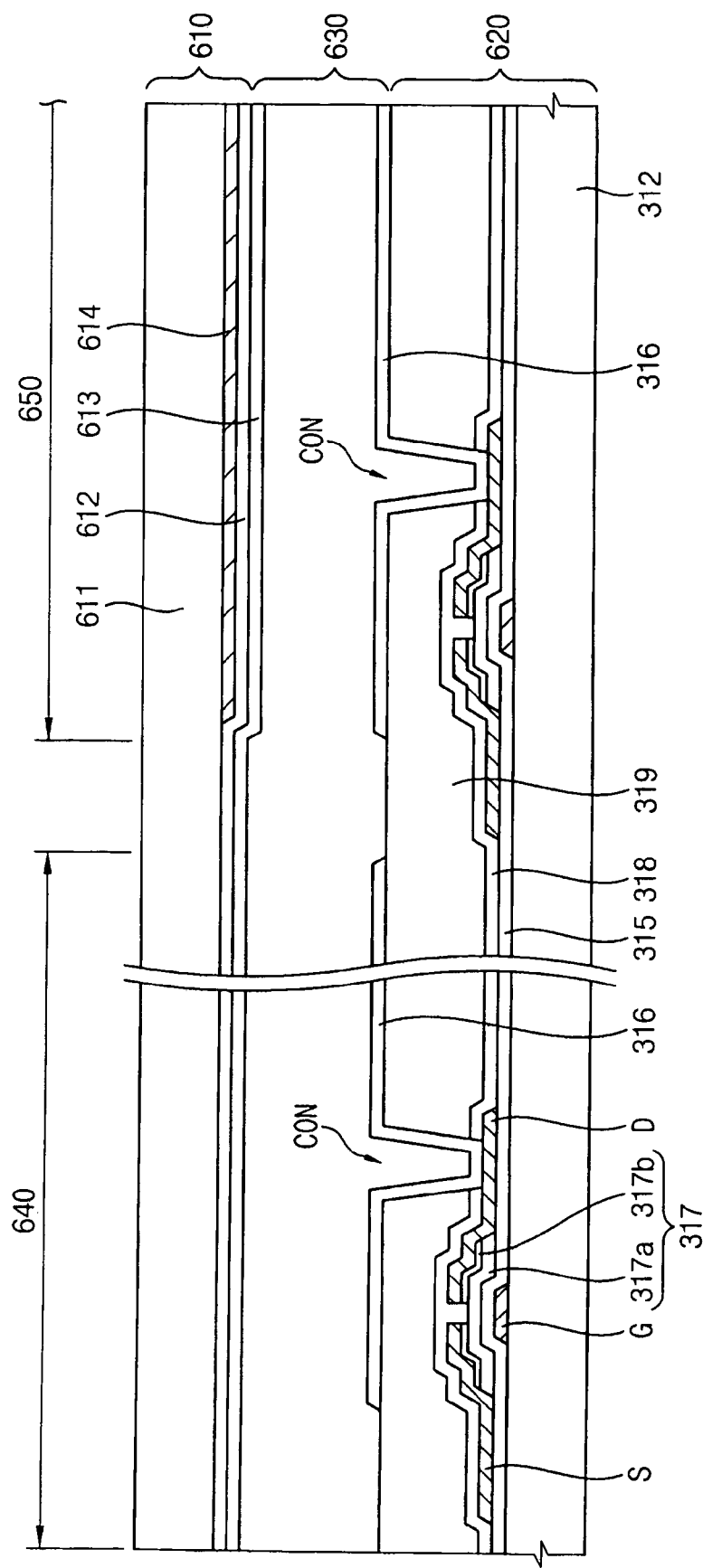
FIG. 6 is a cross-sectional view illustrating a display panel in FIG. 5.

FIG. 5 is a side view illustrating an apparatus for dual display according to another exemplary embodiment of the present invention. FIG. 6 is a cross-sectional view illustrating a display panel in FIG. 5.

Referring to FIGS. 5 and 6, an apparatus for dual display according to the present exemplary embodiment of the present invention includes a light unit 500 and a display panel 600.

The light unit 500 provides the display panel 600 with light to display an image. The light unit 500 includes a light source 510 and a light guide plate 520. The light source 510 generates a light. The light guide plate 220 guides the light generated from the light source 210, and transmits the light toward the display panel 300. The light unit 500 of the present exemplary embodiment is substantially the same as in the above-explained embodiment in FIG. 2, except for a second substrate 620 interposed between a first substrate 610 and the light unit 500, and thus any further repetitive explanation concerning the above elements will be omitted.

The display panel 600 displays the first image by using the light L1 provided by the light unit 500 and transmitted by the display panel 600. The display panel 600 displays the second image by using the light L2 provided by the light unit 500 and reflected by the display panel 600.

The display panel 600 includes a transmissive pixel 640 and a reflective pixel 650. The transmissive pixel 640 transmits the light from the light unit 500 and the reflective pixel 650 reflects the light from the light unit 500. The transmissive pixel 640 and the reflective pixel 650 are alternately disposed with respect to each other.

The display panel 600 includes the first substrate 610, the second substrate 620 and a liquid crystal layer 630. The second substrate is disposed opposite to the first substrate 610 and the liquid crystal layer 630 is interposed between the first substrate 610 and the second substrate 620. The display panel 600 is disposed such that the second substrate 620 is adjacent to the light unit 500. The second substrate 620 corresponds to a TFT substrate and the first substrate 610 corresponds to a color filter substrate.

The second substrate 620 having the TFT substrate of the present exemplary embodiment is the same as in the above-explained embodiment in FIGS. 3 and 4, except for the second substrate 620 not having the reflective layer 360. Thus, the same reference numerals will be used to refer to the same or like parts as those described in the above-explained exemplary embodiment and any further repetitive explanation concerning the above elements will be omitted.

The first substrate 610 having the color filter substrate includes a transparent substrate 611, a color filter layer 612 formed on the transparent substrate 611 and a common electrode 613.

The first substrate 610 further includes a reflective layer 614 to reflect the light provided by the light unit 500. The reflective layer 614 is interposed between the transparent substrate 611 and the color filter layer 612 corresponding to the reflective pixel 650.

The display panel 600 displays the first image by using the light L1 transmitted by the transmissive pixel 640 in the direction of the first substrate 610 corresponding to the TFT substrate. Additionally, the display panel 600 displays the second image different from the first image by using the light L2 reflected by the reflective pixel 650 in the direction of the second substrate 620 having the color filter substrate.

According to the present invention, the apparatus for dual display bi-directionally displays the image by using only one display panel having the transmissive pixel and the reflective pixel and only one light unit, thus allowing a total thickness of the apparatus for dual display to be reduced.

Additionally, the transmissive pixel and the reflective pixel are driven individually and different images are bi-directionally displayed, thus eliminating any anxiety about infringement of privacy.

Furthermore, the plurality of light guide plates included in the light unit plays a role of a window and may replace a separate window, thus allowing a total thickness of the apparatus for dual display to be reduced considerably.

Having described the exemplary embodiments of the present invention and its advantages, it is noted that various changes, substitutions and alterations can be made herein without departing from the spirit and scope of the present invention as defined by the appended claims.

What is claimed is:

1. An apparatus for dual display, comprising:
   a light unit providing a light; and
   a display panel including a transmissive pixel transmitting the light provided from the light unit, and a reflective pixel reflecting the light provided from the light unit,
   wherein the display panel displays a first image by using the light transmitted by the transmissive pixel, and displays a second image by using the light reflected by the reflective pixel,
   wherein the transmissive pixel and the reflective pixel are alternately disposed to each other, and
   wherein the transmissive pixel and the reflective pixel are connected to a same gate line, and are respectively connected to different data lines.

2. The apparatus of claim 1, wherein the display panel comprises:
   a first substrate;
   a second substrate opposite to the first substrate, the second substrate being combined with the first substrate, and disposed adjacent to the light unit; and
   a liquid crystal layer interposed between the first substrate and the second substrate.

3. The apparatus of claim 2, wherein the display panel further comprises a reflective layer corresponding to the reflective pixel and formed on the first substrate.

4. The apparatus of claim 3, wherein the first substrate comprises:
   the gate line and the data lines defining the transmissive pixel and the reflective pixel, respectively; and
   a thin film transistor (TFT) formed on each of the transmissive pixel and the reflective pixel.

5. The apparatus of claim 4, wherein the second substrate comprises a color filter layer.

6. The apparatus of claim 3, wherein the second substrate comprises:
   the gate line and the data lines defining the transmissive pixel and the reflective pixel, respectively; and
   a TFT formed on each of the transmissive pixel and the reflective pixel.

7. The apparatus of claim 6, wherein the first substrate comprises the color filter layer.

8. The apparatus of claim 1, wherein the first image is different from the second image.

9. The apparatus of claim 1, wherein the transmissive pixel and the reflective pixel are driven individually.

10. The apparatus of claim 1, wherein the light unit comprises:
    a light source emitting the light; and
    a light guide plate guiding the light emitted from the light source toward the display panel.

11. The apparatus of claim 10, wherein the light source includes at least one of a light emitting diode and a cold cathode fluorescent lamp (CCFL).

12. The apparatus of claim 1, wherein the display panel displays the first image on one side of the light unit by using the light transmitted by the transmissive pixel, and displays the second image on an opposite side of the light unit by using the light reflected by the reflective pixel.

13. An apparatus for dual display, comprising:
    a light unit providing a light; and
    a display panel including a thin film transistor (TFT) substrate, a color filter substrate combined with the TFT substrate and disposed adjacent to the light unit, a liquid crystal layer interposed between the TFT substrate and the color filter substrate, the display panel having a transmissive pixel transmitting the light provided from the light unit, and a reflective pixel having a reflective layer reflecting the light provided from the light unit,
    wherein the transmissive pixel and the reflective pixel are alternately disposed to each other, and
    wherein the transmissive pixel and the reflective pixel are connected to a same gate line, and are respectively connected to different data lines.

14. The apparatus of claim 13, wherein the reflective layer is formed on the TFT substrate.

15. The apparatus of claim 14, wherein the display panel displays the first image in a direction of the TFT substrate by using the light transmitted by the transmissive pixel, and displays the second image in a direction of the color filter substrate by using the light reflected by the reflective pixel, and wherein the first image and the second image are different from each other.

16. The apparatus of claim 13, wherein the display panel displays the first image on one side of the light unit by using the light transmitted by the transmissive pixel, and displays the second image on an opposite side of the light unit by using the light reflected by the reflective pixel.

17. An apparatus for dual display, comprising:
    a light unit providing a light; and
    a display panel including a thin film transistor (TFT) substrate disposed adjacent to the light unit, a color filter substrate being combined with the TFT substrate, a liquid crystal layer interposed between the TFT substrate and the color filter substrate, the display panel having a transmissive pixel transmitting the light from the light unit, and a reflective pixel having a reflective layer reflecting the light from the light unit,
    wherein the transmissive pixel and the reflective pixel are alternately disposed to each other, and
    wherein the transmissive pixel and the reflective pixel are connected to a same gate line, and are respectively connected to different data lines.

18. The apparatus of claim 17, wherein the reflective layer is formed on the color filter substrate.

19. The apparatus of claim 18, wherein the display panel displays the first image in a direction of the color filter substrate by using the light transmitted by the transmissive pixel, and displays the second image in the direction of the TFT substrate by using the light reflected by the reflective pixel, and wherein the first image and the second image are different from each other.

* * * * *